Aug. 16, 1955     W. H. HOGAN     2,715,341

BUMPER STOP

Filed Dec. 30, 1954

*INVENTOR.*
WALTER H. HOGAN
BY
*ATTORNEY*

United States Patent Office 2,715,341
Patented Aug. 16, 1955

2,715,341
BUMPER STOP

Walter H. Hogan, Olmsted Falls, Ohio, assignor to The Cleveland Pneumatic Tool Company, Cleveland, Ohio, a corporation of Ohio Application December 30, 1954, Serial No. 478,655

7 Claims. (Cl. 74—424.8)

This invention relates generally to bumper stops and more particularly to a bumper stop to be used in conjunction with a nut and screw to cushion the impact when either the nut or screw reaches the end of its travel.

In many screw jacks, particularly of the type incorporated in ball screws, large rotational velocities of the nut are reached which inherently result in the storing of substantial amounts of kinetic energy in the rotating nut. If the nut must be limited in its travel along the screw, some means must be provided to bring the nut to rest when it reaches the end of its travel. If rigid stop means are provided to serve this purpose, failure in the form of either breakage or jamming often occurs. In the past a resilient stop washer has sometimes been used to cushion the impact after the nut reaches the end of its travel. However, such devices have limited energy absorbing capacity since the energy must be dissipated and stored by the deflection of the stop material itself.

In a bumper stop according to this invention, the impact energy is dissipated as friction operating through a relatively long distance without any harmful deflection in the stop device. Also a bumper stop according to this invention provides a very simple structure which may be manufactured by the use of low cost, high production methods.

In order to simplify this disclosure, I will describe a structure wherein the screw is stationary and wherein the nut is rotatable and axially movable on the screw. However, it should be realized that this invention is not limited to such a system but rather encompasses a bumper stop embodying the invention disclosed, in combination with any nut or screw wherein relative rotation and axial motion is possible between the nut and screw and wherein the relative axial motion is limited in at least one direction.

It is an important object of this invention to provide a new and improved bumper stop for use in connection with screws and nuts to cushion the impact when the nut or screw reaches the end of its travel.

It is another object of this invention to provide a friction bumper stop for use in conjunction with screws and nuts capable of absorbing and dissipating by friction substantial amounts of energy.

It is another object of this invention to provide a bumper stop for ball screw mechanisms which are capable of dissipating substantial impact energy wherein the bumper stop is structurally simple and substantially immune to failure.

Further objects and advantages will appear from the following description and drawings, wherein.

Figure 1:
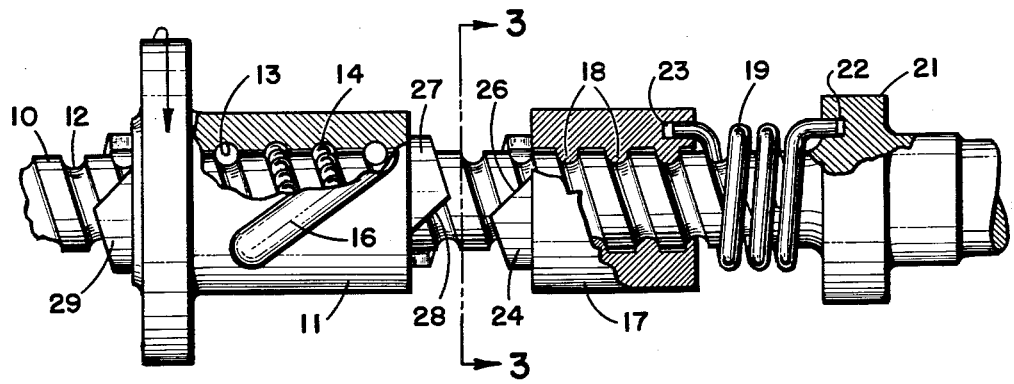
Figure 1 is a side elevation partially in longitudinal section of a bumper stop according to this invention, showing a bumper stop as it would be applied to a ball screw mechanism.
Figure 2:
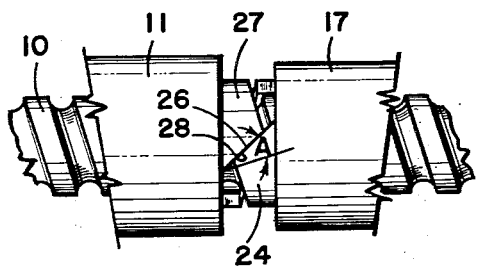
Figure 2 is a fragmentary side elevation showing the position of the elements when the bumper stop comes into operation.
Figure 3:
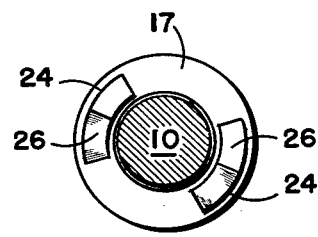
Figure 3 is an end view of the bumper stop member taken along 3—3 of Figure 1; and, Figure 4 is a fragmentary perspective view partially in longitudinal section of the bumper stop.
Figure 4:
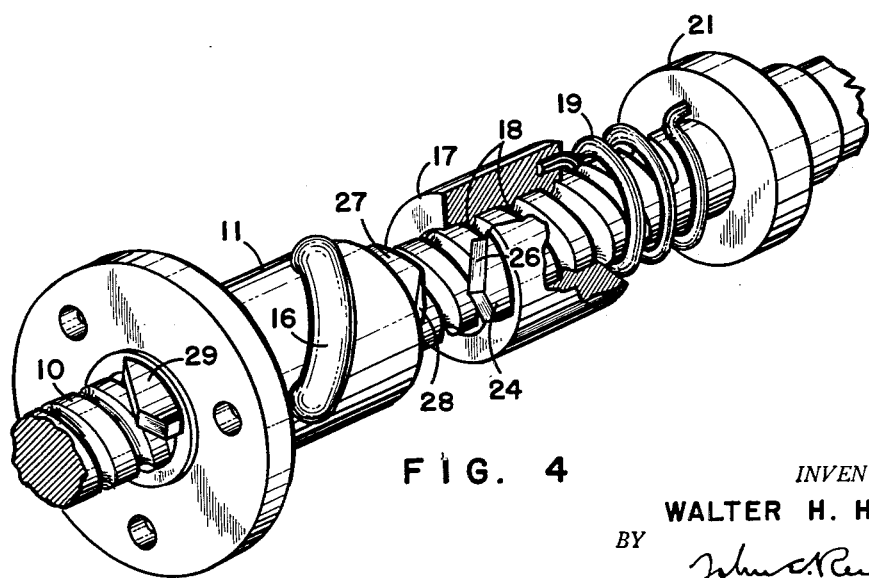

In the embodiment of this invention shown in the drawings, a bumper stop is illustrated as it would be used in connection with a ball screw mechanism. In this case a screw 10 cooperates with a nut 11 in the usual manner and each is provided with a helical groove 12 and 13 respectively which cooperate to define a helical ball channel filled with balls 14. A return tube 16 is mounted on the nut 11 and is adapted to convey the balls between the ends of the nut to form a closed ball pass. In this structure relative rotation between the nut and screw creates relative axial motion therebetween.

A bumper stop 17 is mounted on the screw and is provided with a helical thread 18 adapted to fit into the groove 12 so that relative rotation between the bumper stop and the screw produces a sliding action between the surface of the groove 12 and the thread 18. A torque spring 19 is mounted with one end anchored in an integral flange 21 of the screw and the other end anchored in the end of the bumper stop 17. This anchoring may be accomplished by providing apertures 22 and 23 in the flange 21 and bumper stop 17 respectively into which the ends of the spring project. The spring 19 will supply torque which resists rotation of the bumper stop 17 away from the spring's unstressed position in either direction. The unstressed position of the spring 19 should be arranged so that axial motion of the bumper stop 17 toward the flange 21 is possible without physical interference of the spring 19.

The left hand end of the bumper stop 17 is formed with two or more symmetrically located projections 24 each provided with an inclined face 26. The right hand end of the nut 11 is also formed with similarly spaced projections 27 each provided with an inclined face 28 adapted to engage the face 26 of the projections 24. The faces 26 and 28 are formed to be inclined relative to the plane of the groove 12 by an angle A which will be described in detail later. The left end of the nut 11 may be provided with similar projections 29 which would be proportioned to engage a bumper stop at the other end of the screw 10. Since the bumper stops at either end of the screw would be alike in function and structure, only a single bumper stop will be described and shown.

In operation, assuming that the screw is stationary and the nut is rotating in the direction indicated by the arrow in Figure 1, the nut will move axially toward the bumper stop 17. This will continue until the faces 28 on the nut 11 engage the faces 26 on the bumper stop 17. Since both the bumper stop 17 and the nut 11 are mounted on the screw 10, no difficulty in orientation will be present and proper engagement will occur each time the nut approaches the bumper stop. Preferably the nut 11, bumper stop 17 and the projections 24 and 27 are formed of metal with the faces 26 and 28 smooth so that a relatively low coefficient of friction is present between the faces. Since the faces 26 and 28, when engaged provide a low coefficient of friction and since there is essentially no motion between them after engagement, the force of engagement will be substantially normal to the plane of the faces. Also since this normal force is inclined relative to the direction of the screw, it resolves into two components of force; one in the direction of the groove 12 and the other axially of the screw 10. The force in the direction of the groove 12 will cause rotation of the bumper stop 17 against the resistance of the spring 19 and the force axially of the screw 10 will provide axial loading of the thread 18 relative to the groove 12. This axial loading creates a frictional resistance to the rotation of the bumper stop 17 relative to the screw which is proportional to the axial component. The normal force between the two faces 26 and 28 will be a function of the angle A and the resisting force of the spring 19 if the mass inertia of the bumper stop 17 is small. Therefore, as the bumper stop 17 rotates under the influence of the nut 11, the axial force on the bumper stop will increase and therefore the reaction of friction is increased. This will cause an absorption of the kinetic energy of the nut 11. Since this resisting friction takes place along the surface of the groove 12, a fairly long friction absorption distance is present even though the bumper stop 17 moves axially only a short distance. After the nut 11 comes to rest, nut rotation in the opposite direction permits the spring 19 to move the bumper stop back to its original position. However, since the inherent friction of the bumper stop operates to resist this motion, very little energy will be delivered to the nut 11. Therefore, the bumper stop according to this invention is capable of absorbing without storing a substantial amount of energy.

The relationship between the angle A and the coefficient of friction between the threads 18 and the groove 12 must be arranged so that the product of the tangent of the angle A times this coefficient of friction will be less than one so that locking will not occur. However, the product of the coefficient of friction and the tangent of the angle A should approach one for a maximum of energy absorption. It is apparent that by utilizing a structure according to this invention, it is possible to produce a very simple and effective high capacity bumper stop which is capable of long life where tolerances of manufacture are not particularly critical.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. In combination a screw formed with a helical thread, a cooperating nut member threaded on said screw, said nut member and screw being mounted for relative rotational and axial motion therebetween, a bumper stop member on said screw formed with a thread engaging said screw thread, one of said members being formed with a first axially facing surface inclined relative to said screw thread, the other of said members being formed with a second surface engageable with said first surface and resilient means resisting motion of said bumper stop relative to said screw by virtue of engagement between said surfaces.

2. In combination a screw formed with a helical thread, a cooperating nut member threaded on said screw, said nut member and screw being mounted for relative rotational and axial motion therebetween, a bumper stop member on said screw formed with a thread engaging said screw thread, one of said members being formed with a first axially facing surface inclined relative to said screw thread, the other of said members being formed with a second surface engageable with said first surface, and resilient torque means resisting rotational motion of said bumper stop relative to said screw by virtue of engagement between said surfaces.

3. In combination a screw formed with a helical thread, a cooperating nut member threaded on said screw, said nut member and screw being mounted for relative rotational and axial motion therebetween, a bumper stop member on said screw formed with a thread engaging said screw thread, one of said members being formed with a first axially facing surface inclined relative to said screw thread, the other of said members being formed with a second surface engageable with said first surface, and resilient torque means resisting rotational motion of said bumper stop relative to said screw by virtue of engagement between said surfaces, the product of the tangent of the angle of inclination between said first surface and said screw thread times the coefficient of friction between said screw and bumper stop threads being less than one.

4. In combination a screw formed with a helical thread, a cooperating nut threaded on said screw, said nut and screw being mounted for relative rotational and axial motion therebetween, a bumper stop on said screw formed with a thread engaging said screw thread and a plurality of axially facing symmetrically located surfaces inclined relative to said screw thread, said nut being formed with a plurality of symmetrically located surfaces engageable with said bumper stop surfaces, and resilient torque means resisting rotational motion of said bumper stop relative to said screw by virtue of engagement between said surfaces, the product of the tangent of the angle of inclination between said bumper stop surfaces and said screw thread times the coefficient of friction between said screw and bumper stop thread being less than one.

5. In combination a screw formed with a helical thread, a cooperating nut threaded on said screw, said nut and screw being mounted for relative rotational and axial motion therebetween, a bumper stop on said screw formed with a thread engaging said screw thread, said nut being formed with a plurality of axially facing symmetrically located surfaces inclined relative to said screw thread, said bumper stop being formed with a plurality of symmetrically located surfaces engageable with said nut surfaces, and resilient torque means resisting rotational motion of said bumper stop relative to said screw by virtue of engagement between said surfaces, the product of the tangent of the angle of inclination between said nut surfaces and said screw thread times the coefficient of friction between said screw and bumper stop thread being less than one.

6. In combination a screw formed with a helical thread, a cooperating nut threaded on said screw, said nut and screw being mounted for relative rotational and axial motion therebetween, a bumper stop on said screw formed with a thread engaging said screw thread and a plurality of axially facing symmetrically located surfaces inclined relative to said screw thread, said nut being formed with a plurality of symmetrically located surfaces inclined relative to the screw thread by the same angle as said bumper stop surfaces positioned for engagement therewith, and resilient torque means resisting rotational motion of said bumper stop relative to said screw by virtue of engagement between said surfaces, the product of the tangent of the angle of inclination between said surfaces and said screw thread times the coefficient of friction between said screw and bumper stop thread being less than one.

7. In combination first and second cooperating screw threaded elements mounted for relative rotational and axial motion therebetween, a bumper stop formed with a thread engaging the thread of one of said elements and a plurality of axially facing symmetrically located surfaces inclined relative to the thread of said one element, said first element being formed with a plurality of symmetrically located surfaces engageable with said bumper stop surfaces, and resilient torque means between said second element and said bumper stop resisting rotational motion of said bumper stop by virtue of engagement between said surfaces.

No references cited.